June 20, 1944.  M. KATCHER  2,351,617
STEERING GEAR FOR AUTOMOBILES AND THE LIKE
Filed July 13, 1943
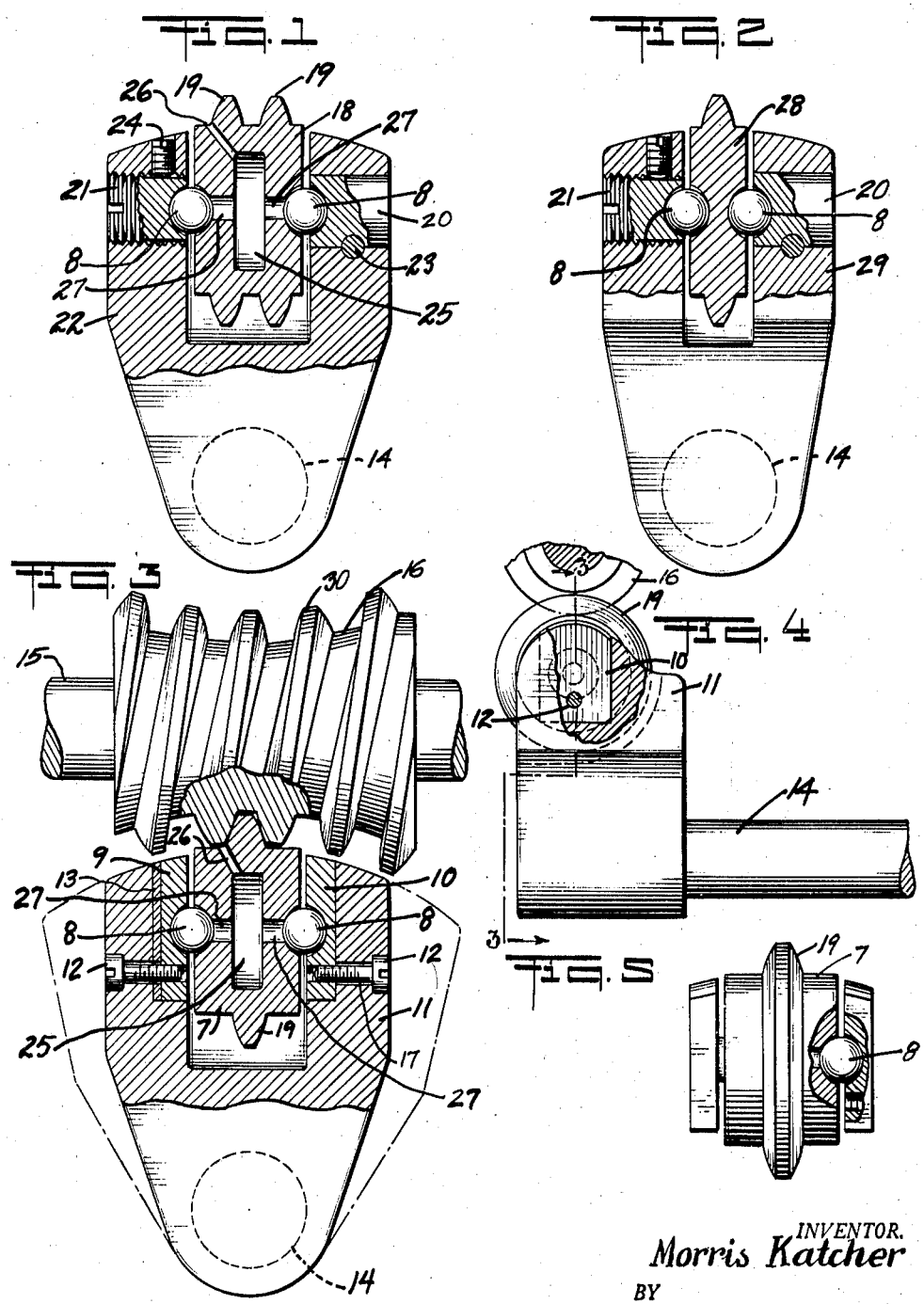
INVENTOR.
Morris Katcher
BY
Emanuel Scheyer
ATTORNEY Patented June 20, 1944

2,351,617

UNITED STATES PATENT OFFICE 2,351,617

STEERING GEAR FOR AUTOMOBILES AND THE LIKE

Morris Katcher, New York, N. Y.

Application July 13, 1943, Serial No. 494,473

7 Claims. (Cl. 74—500)

This invention relates to steering gear for automobiles or the like, in which a steering column which is turned by the steering wheel, has on it a worm, the thread of which engages a roller rotatably mounted in a rock arm fixed to a rocker shaft which effects the steering.

A particular object is the mounting of the roller on the rock arm, which mounting is simple and can be readily adjusted for wear. Another object is the provision of a lubricant reservoir which lubricates both the ball bearing of the roller and its periphery at its engagement with the thread of the worm.

Other objects and advantages will become apparent upon further study of the description and drawing, in which:

Fig. 1 is a sectional elevation of a double ribbed roller and its mounting in one form of the invention, said roller being shown without the steering worm.

Fig. 2 is a sectional elevation of a single tooth or rib roller and its mounting in another form of the invention, said roller also being shown without the steering worm.

Fig. 3 is a sectional elevation of a single tooth roller shown in engagement with a steering worm, said section being taken generally along the line 3—3 of Fig. 4.

Fig. 4 is a side elevation partially in section and to a smaller scale of the roller of Fig. 3 and its mounting on the rocker shaft and the steering worm and steering column, and Fig. 5 is an elevation with a part in section of the single tooth roller of Fig. 3 and its mounting blocks and balls shown by themselves.

Roller 7 having a single tooth or rib 19, Figs. 3, 4 and 5, is provided with sockets on opposite sides thereof on line with its axis of rotation, for receiving balls 8. Blocks 9 and 10 are also provided with oppositely disposed sockets for engaging said balls. Blocks 9 and 10 are set in recesses of the cavity of forked rock arm 11. Screws 12 fasten said blocks in the arm. Between block 9 and the arm is a shim 13 to provide for axial adjustment of roller 7. Bracket or arm 11 is fixedly mounted on rocker shaft 14 of the steering mechanism. Steering post 15 carries upon it a worm 16 in the grooves of which tooth 19 of roller 7 works. The grooves and thread 30 of worm 16 are so formed as to accommodate the swinging of roller 7 about the axis of rocker shaft 14.

Blocks 9 and 10, balls 8 and roller 7 are put together outside of rock arm 11, Fig. 5, and then slid while together into the cavity or recess in said arm. Screws 12 are then inserted in threaded holes 17 provided in blocks 9 and 10. This holds the entire assembly in place in rock arm 11.

When it is desired to operate the steering gear, steering post 15 is rotated, worm 16 rotating with it. This causes worm 16 to effect the travel of the tooth 19 of roller 7 along its thread 30. Such travel rotates rock arm 11 and with it rocker shaft 14. During such travel, roller 7 is also rotated.

Roller 18, Fig. 1 is provided with two teeth or ribs 19. It has sockets in its sides on line with its axis of rotation which support part of balls 8. Another part of each ball is supported in a socket provided in one of plugs 20 or 21. Plug 21 is a screw plug set in an internally threaded hole which leads from the outside of rock arm 22 to the cavity in its interior which holds roller 18. Plug 20 is slid into another hole leading from the cavity to the opposite side of rock arm 22. A pin 23, driven in with a forced fit locks plug 20 in rock arm 22. Screw plug 21 can be turned to adjust the pressure on balls 8 and to compensate for wear. A set screw 24 is provided to lock plug 21 in position.

Rollers 7 and 18 are each provided with a lubricant reservoir 25 having a relatively narrow passage 26 leading from it to the periphery of the roller substantially at the base of a rib 19. Axial passages 27 are also provided which lead from lubricant reservoir 25 to the sockets for balls 8.

Single rib roller 28, Fig. 2, has the same mounting in rock arm 29 as has roller 18 in rock arm 22, Fig. 1.

I claim:

1. For use in a steering gear having a rotatable steering column with a worm mounted on the column, a roller element for engaging at its periphery the thread of the worm, a rock arm supporting in it the roller element in contact with the thread and a ball between each side of the roller element and the rock arm, said balls being located in line with the axis of rotation of said roller element, providing a pivotal support for the roller element in the rock arm, the rotation of the worm swinging the rock arm and rotating the roller element.

2. For use in a steering gear having a rotatable steering column with a worm mounted on the column, a roller element for engaging at its periphery the thread of the worm, a rock arm holding the roller element in contact with the thread, said arm supporting the roller element in a cavity provided in the former, and a ball between each side of the roller element and the rock arm, said roller element having a socket on each side of it on line with its axis of rotation for receiving part of a ball, another part of each ball being held by said arm, said balls providing a pivotal support for the roller element in the rock arm, the rotation of the worm swinging the rock arm and rotating the roller element.

3. For use in a steering gear having a rotatable steering column with a worm mounted on the column, a roller element for engaging at its periphery the thread of the worm, a rock arm holding the roller element in contact with the thread, said arm supporting the roller element in a cavity provided in the former, blocks mounted in the cavity, a block being set on each side of the roller element, and a ball between each side of the roller element and its adjacent block, sockets for holding the balls being provided in each side of the roller element and in the sides of the blocks facing the roller element, said sockets being in alignment with the axis of rotation of the roller element whereby the balls provide a pivotal support for the roller element, the rotation of the worm swinging the rock arm and rotating the roller element.

4. For use in a steering gear having a rotatable steering column with a worm mounted on the column, a roller element for engaging at its periphery the thread of the worm, a rock arm holding the roller element in contact with the thread, said arm supporting the roller element in a cavity provided in the former, said rock arm being provided with oppositely disposed openings, each opening extending from the outer surface of said arm to the cavity, a plug fastened in each of said openings adjacent a side of the roller element, and a ball between each side of the roller element and its adjacent plug, sockets for holding the balls being provided in each side of the roller element and in the sides of the plugs facing the roller element, said sockets being in alignment with the axis of rotation of the roller element whereby the balls provide a pivotal support for the roller element, the rotation of the worm swinging the rock arm and rotating the roller element.

5. For use in a steering gear having a rotatable steering column with a worm mounted on the column, a roller element for engaging at its periphery the thread of the worm, a rock arm rotatably supporting the roller element in contact with said thread whereby rotation of the worm swings said arm and rotates the roller element, said roller element having an open space in its interior with a relatively narrow passage leading from said space to the periphery of the roller element, said space serving as a lubricant reservoir.

6. For use in a steering gear having a rotatable steering column with a worm mounted on the column, a roller element formed with a circumferential rib about its periphery for engaging the thread of the worm, a rock arm rotatably supporting the roller element in contact with said thread whereby rotation of the worm swings said arm and rotates the roller element, said roller element having an open space in its interior with a relatively narrow passage leading from said space to its periphery substantially at the base of said rib, said space serving as a lubricant reservoir.

7. For use in a steering gear having a rotatable steering column with a worm mounted on the column, a roller element for engaging at its periphery the thread of the worm, a rock arm holding the roller element in contact with the thread, said arm supporting the roller element in a cavity provided in the former, and a ball between each side of the roller element and the rock arm, said roller element having a socket on each side of it for receiving part of a ball, another part of each ball being held by said arm, said balls providing a rolling support for the roller element in the rock arm, the rotation of the worm swinging the rock arm and rotating the roller element, said roller element having an open space in its interior to serve as a lubricant reservoir with axially extending passages leading therefrom, each passage leading from the reservoir to one of said sockets.

MORRIS KATCHER.